United States Patent
Abe et al.

(10) Patent No.: US 7,532,425 B2
(45) Date of Patent: *May 12, 2009

(54) REPRODUCING METHOD, REPRODUCING APPARATUS, RECORDING AND REPRODUCING APPARATUS, AND MAGNETIC RECORDING MEDIUM

(75) Inventors: Naoto Abe, Kanagawa (JP); Takeshi Nagata, Kanagawa (JP); Hisashi Osawa, Ehime (JP); Yoshihiro Okamoto, Ehime (JP)

(73) Assignee: FUJIFILM Corporation, Tokyo (JP)

( * ) Notice: Subject to any disclaimer, the term of this patent is extended or adjusted under 35 U.S.C. 154(b) by 550 days.

This patent is subject to a terminal disclaimer.

(21) Appl. No.: 11/156,461

(22) Filed: Jun. 21, 2005

(65) Prior Publication Data

US 2006/0285241 A1    Dec. 21, 2006

(51) Int. Cl.
*G11B 5/35* (2006.01)
(52) U.S. Cl. .............. 360/65; 360/29; 360/55; 428/842.8
(58) Field of Classification Search ............. 360/65; 428/842.8
See application file for complete search history.

(56) References Cited

U.S. PATENT DOCUMENTS

| | | | | |
|---|---|---|---|---|
| 5,347,408 A * | 9/1994 | Gohda et al. | ........... | 360/65 |
| 5,886,844 A * | 3/1999 | Shimizu | ........... | 360/65 |
| 5,904,979 A * | 5/1999 | Kakuishi et al. | ........ | 428/842.3 |
| 5,995,545 A * | 11/1999 | Ueno | ............. | 375/233 |
| 6,249,398 B1 * | 6/2001 | Fisher et al. | ......... | 360/65 |
| 6,337,889 B1 * | 1/2002 | Mita et al. | ........... | 375/341 |
| 6,501,610 B1 * | 12/2002 | Sugawara et al. | ........ | 360/65 |
| 6,912,100 B2 * | 6/2005 | Sawaguchi et al. | ........ | 360/45 |
| 6,944,105 B2 * | 9/2005 | Wakabayashi et al. | ... | 369/47.17 |
| 7,236,319 B2 * | 6/2007 | Abe et al. | ........... | 360/65 |
| 7,295,394 B2 * | 11/2007 | Nagata et al. | ......... | 360/65 |
| 2003/0049491 A1 * | 3/2003 | Ejiri | ............. | 428/694 BH |

FOREIGN PATENT DOCUMENTS

JP    2001-325712    11/2001
JP    2002-157827 A   5/2002

* cited by examiner

*Primary Examiner*—Hoa T Nguyen
*Assistant Examiner*—Dismery E Mercedes
(74) *Attorney, Agent, or Firm*—Sughrue Mion, PLLC

(57) ABSTRACT

A recording and reproducing apparatus includes: a recording section for recording an information signal in a magnetic recording medium including a magnetic layer including hexagonal ferrite; a reproducing section for reproducing the information signal recorded in the magnetic recording medium, the reproducing section including: a reproducing head for reading the information signal from the magnetic recording medium; an equalizer for equalizing the information signal read from the magnetic recording medium, wherein a partial response of the information signal after equalization by the equalizer satisfies a condition that $0.4 \leq a < 3.0$, $-0.6 \leq b < 2.0$, $-2.0 < c \leq -0.2$, $-3.0 < d \leq -0.4$, and $-1.0 < e \leq 0.0$. A corresponding reproducing method, a corresponding reproducing apparatus, and the magnetic recording medium are also disclosed.

18 Claims, 4 Drawing Sheets

| NORMALIZED LINE DENSITY K | COEFFICIENT a | COEFFICIENT b | COEFFICIENT c | COEFFICIENT d | COEFFICIENT e | BER at PR(1,a,b,c,d,e) | BER at PR(1,3,2,-2,-3,-1) | COMPARISON WITH PR(1,3,2,-2,-3,-1) | BER ≦1E-04 |
|---|---|---|---|---|---|---|---|---|---|
| 2.3 | 0.4 | -0.6 | -0.2 | -0.4 | 0.0 | <1E-06 | <1E-06 | ○ | ○ |
| 2.6 | 0.9 | -0.5 | -0.8 | -0.5 | -0.1 | <1E-06 | <1E-06 | ○ | ○ |
| 3.1 | 0.9 | -0.4 | -0.8 | -0.6 | -0.1 | <1E-06 | 4.1E-06 | ○ | ○ |
| 3.4 | 1.3 | 0.0 | -1.1 | -1.0 | -0.2 | <1E-06 | 7.6E-05 | ○ | ○ |
| 3.9 | 1.2 | -0.1 | -1.0 | -0.9 | -0.2 | 4.00E-06 | 2.1E-03 | ○ | ○ |
| 4.7 | 1.3 | -0.1 | -1.0 | -0.9 | -0.2 | 1.50E-05 | 6.0E-03 | ○ | ○ |
| 5.2 | 1.3 | -0.1 | -1.1 | -1.0 | -0.3 | 7.00E-03 | 8.4E-02 | ○ | × |

FIG. 5

| RATIO γ | BER RELATIVE VALUE | (ORDER) |
|---|---|---|
| 4.8 | 1.7 | × |
| 9.8 | 1.0 | ○ |
| 14.7 | 0.7 | ○ |
| 20.5 | 0.4 | ○ |
| 25.2 | 0.2 | ○ |
| 30.4 | 0.0 | ○ |
| 36.0 | 0.1 | ○ |
| 40.2 | 0.3 | ○ |
| 44.6 | 0.5 | ○ |
| 51.2 | 0.7 | ○ |
| 59.6 | 0.9 | ○ |
| 60.0 | 1.0 | ○ |

REPRODUCING METHOD, REPRODUCING APPARATUS, RECORDING AND REPRODUCING APPARATUS, AND MAGNETIC RECORDING MEDIUM

BACKGROUND OF THE INVENTION

Field of the Invention

The present invention relates to a reproducing method, a reproducing apparatus, a recording and reproducing apparatus, and a magnetic recording medium that are adapted to a high density recording.

In recent years an improvement of a recording density in a magnetic recording medium such as a magnetic recording tape and a magnetic disk is remarkable. Therefore, corresponding to a high recording density of a recording medium, various technologies are suggested regarding a recording and reproducing apparatus and are in practical use. For example, various technologies are suggested for an adoption of an MR (Magneto Resistive) head as a reproducing head, an improvement of an interface with the recording medium and the heads, and the like, and are in practical use. Furthermore, also in a sphere of a signal processing technology, in order to recover a deterioration of an S/N ratio accompanied with the high recording density, a PRML system combining a PR (partial response) system and an ML (Maximum Likelihood) system is in practical use in a recording and reproducing apparatus for using a recording medium such as a magnetic disk, a digital video tape, a magnetic tape for a computer backup, and an optical disk.

Such a recording and reproducing apparatus is disclosed in Japanese Patent Laid-Open Publication No. 2002-157827. U.S. Pat. No. 6,337,889, which is incorporated herein by reference, also discloses this technology, wherein U.S. Pat. No. 6,337,889 corresponds to Japanese Patent Laid-Open Publication No. 2002-157827.

However, when a magnetic recording medium having a magnetic layer containing hexagonal ferrite as a magnetic material is used, although the magnetic recording medium has a characteristic that a reproducing output is high and has a low noise in high density recording, there is a problem in reproducing. This is because the hexagonal ferrite has a magnetization component of a vertical direction in an in-plane orientation or a random orientation, derived from a crystal structure thereof, so that an isolated inversion reproducing waveform becomes a unique waveform, where an isolated inversion reproducing waveform in the in-plane orientation and one in the vertical direction are added. This impeded the PRML signal processing (here, EEPR4ML: PR(1, 3, 2, −2, −3, −1)), which was optimized for the magnetic recording medium in which data is recorded by magnetizing in the in-plane orientation, from being adopted.

SUMMARY OF THE INVENTION

An aspect of the present invention provides a reproducing method, a reproducing apparatus, a recording and reproducing apparatus, and a magnetic recording medium, adapted to a PRML (Partial Response Maximum Likelihood) signal processing that is optimum for a magnetic recording medium including a magnetic layer containing hexagonal ferrite, and a magnetic recording medium adapted to a PRML signal processing.

Another aspect of the present invention provides a method of reproducing an information signal recorded in a magnetic recording medium including a magnetic layer including hexagonal ferrite, the method comprising the steps of: reproducing the information signal from the magnetic recording medium; effecting a PR (1, a, b, c, d, e) ML signal processing under a condition that $0.4 \leq a < 3.0$, $-0.6 \leq b < 2.0$, $-2.0 < c \leq -0.2$, $-3.0 < d \leq -0.4$, and $-1.0 < e \leq 0.0$.

In this method, a signal processing is effected in which PR (1, a, b, c, d, e) satisfying the predetermined condition mentioned above is used for the signal processing to the magnetic recording medium. This provides an optimum PRML signal processing for the magnetic recording medium having a crystalline structure of hexagonal ferrite.

A further aspect of the present invention provides a reproducing apparatus for reproducing an information signal recorded in a magnetic recording medium including a magnetic layer including hexagonal ferrite, the apparatus comprising: a reproducing head for reading the information signal from the magnetic recording medium; an equalizer for equalizing the information signal read from the magnetic recording medium, wherein a partial response PR(1, a, b, c, d, e) of the information signal after equalization by the equalizer satisfies a condition that $0.4 \leq a < 3.0$, $-0.6 \leq b < 2.0$, $-2.0 < c \leq -0.2$, $-3.0 < d \leq -0.4$, and $-1.0 < e \leq 0.0$.

In this reproduction apparatus, a signal processing is effected in which PR (1, a, b, c, d, e) satisfies the predetermined condition mentioned above. This provides an optimum PRML signal processing for the magnetic recording medium having the crystalline structure of hexagonal ferrite.

A still further aspect of the present invention provides recording and reproducing apparatus comprises: recording means for recording an information signal in a magnetic recording medium including a magnetic layer including hexagonal ferrite; reproducing means for reproducing the information signal recorded in the magnetic recording medium, the reproducing means comprising: a reproducing head for reading the information signal from the magnetic recording medium; an equalizer for equalizing the information signal read from the magnetic recording medium, wherein a partial response of the information signal after equalization by the equalizer satisfies a condition that $0.4 \leq a < 3.0$, $-0.6 \leq b < 2.0$, $-2.0 < c \leq -0.2$, $-3.0 < d \leq -0.4$, and $-1.0 < e \leq 0.0$.

In this recording and reproduction apparatus, a signal processing is effected in which PR (1, a, b, c, d, e) satisfying the predetermined condition mentioned above is used for the signal processing. This provides an optimum PRML signal processing for the magnetic recording medium having the crystalline structure of hexagonal ferrite.

According to the present invention, a recording density can be improved because a magnetic recording medium comprising a magnetic layer including hexagonal ferrite is used, and the signal processing for the magnetic recording medium is effected by the PRML method optimized for the recording; medium.

BRIEF DESCRIPTION OF THE DRAWINGS

The object and features of the present invention will become more readily apparent from the following detailed description taken in conjunction with the accompanying drawings in which:

FIG. 4 is a table illustrating a result of simulation (1) according to the embodiment of the present invention; and FIG. 5 is a table illustrating a result of simulation (2) according to the embodiment of the present invention.

The same or corresponding elements or parts are designated with like references throughout the drawings.

DETAILED DESCRIPTION OF THE INVENTION

Figure 1:
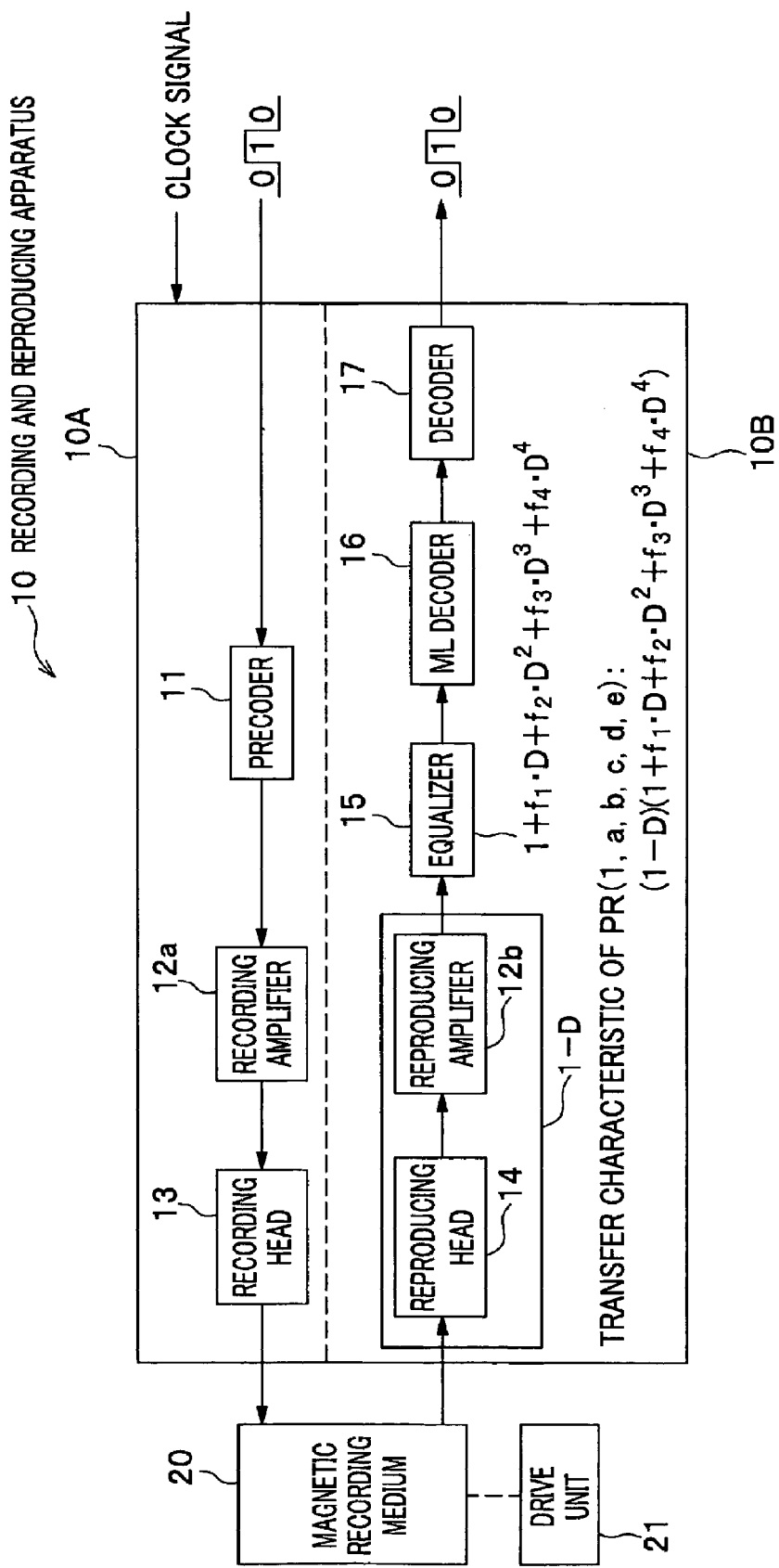
FIG. 1 is a block diagram of a recording and reproducing apparatus according to an embodiment of the present invention.

A magnetic recording medium, a recording and reproducing apparatus, and a reproducing method according to the present invention will be described.

<Magnetic Recording Medium>

The magnetic recording medium comprises a base (support body), at least one non-magnetic layer, and at least one magnetic layer, in which the non-magnetic layer and the magnetic layer are laminated (coated) on one surface or both surfaces of the base. The base may be formed, for example, in a tape, a disk (flexible disk or hard disk), or a card (flexible or hard card).

As the base can be used any of such a film and sheet consisting of various synthetic resins such as polyethylene terephthalate, polyethylene, polypropylene, polycarbonate, polyethylene naphthalate, polyamide, polyamide imide, polyimide, polysulfone, polyethersulfone; a metal such as aluminum and stainless steel, appropriately formed according to an application and form of the magnetic recording medium.

It is preferable that the magnetic recording medium comprises a back layer for smoothing contact with a surface of the base at a side opposite to the magnetic layer when contacting any of a recording head and a reproducing head.

In addition, the magnetic recording medium may have layers other than the non-magnetic layer, the magnetic layer, and the back layer. For example, the magnetic recording medium may have a soft magnetic layer containing a soft magnetic powder, a second magnetic layer, a cushion layer, an overcoat layer, an adhesion layer, and a protection layer. These layers can be provided at adequate positions so as to effectively bring out their functions. A thickness of the magnetic layer is preferably 10 nm to 300 nm, more preferably 10 nm to 200 nm, and most preferably 10 nm to 100 nm. In addition, a thickness of the non magnetic layer can be made 0.5 μm to 3 μm. It is desirable that the thickness of the non magnetic layer is thicker than that of the magnetic layer.

<Hexagonal Ferrite>

As the magnetic recording layer, hexagonal ferrite is formed. As hexagonal ferrite can be cited barium ferrite, strontium ferrite, lead ferrite, calcium ferrite, and various substitution materials, for example, a Co substitution material, and the like. To be more precise, as the hexagonal ferrite powder can be cited a magnetoplumbite type barium ferrite and strontium ferrite, the magnetoplumbite type ferrite whose particle surface is covered with spinel, further a compound magnetoplumbite type barium ferrite and strontium ferrite that partially contain a spinel phase, and the like; and other than predetermined elements, following ones may be contained: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Generally, the hexagonal ferrite powder where following compounds are added can be used: Co—Zn, Co—Ti, Co—Ti—Zr, Co—Ti—Zn, Nb—Zn—Co, Sn—Zn—Co, Sn—Co—Ti, Nb—Zn, and the like. In addition, a W-type hexagonal ferrite can also be used.

Furthermore, some hexagonal ferrite powders may contain a specific impurity in accordance with materials and/or manufacturing methods. These hexagonal ferrites are used in a form of a hexagonal platy powder.

In reproducing with high density recording, especially with the MR head, a noise can be reduced and a higher S/N ratio can be obtained by making the average plate diameter and plate thickness of particles in the hexagonal ferrite magnetic powder not more than 50 nm and not more than 15 nm, respectively. A specific surface area by the BET method is usually 30 $m^2$/g to 200 $m^2$/g, and preferably 50 $m^2$/g to 100 $m^2$/g. The specific surface area roughly accords with an arithmetic calculation value from a diameter and a plate thickness of a particle of a powder. The narrower a distribution of a product of a plate diameter and a plate thickness is, the more preferable it is. Although the distribution is not always a normal distribution, it is expressed as σ/(average plate diameter or average plate thickness)=0.1 to 0.5 if calculated and expressed in a standard deviation for a powder size. In order to make a powder particle size distribution sharp, it is performed to make a powder generation-reaction system uniform as much as possible and to also dispense a distribution improvement treatment to a generated powder. For example, such a method of selectively dissolving an ultra fine powder in an acid solution is also known. In a vitrification-crystallization method a more uniform powder is obtained by performing heat treatments plural times and separating a nucleus generation and growth. Although the coercivity Hc measured in a magnetic powder can be made till around 40 kA/m to 400 kA/m, 144 kA/m to 300 kA/m is preferable. Although a higher Hc is more advantageous in high density recording, it is limited according to an ability of a recording head. An Hc can be controlled by the powder particle size (the product of a plate diameter and a plate thickness), kinds and amounts of contained elements, substitution sites of elements, powder generation-reaction conditions, and the like.

A saturation magnetization σS of the hexagonal ferrite magnetic powder is preferably 30 A·$m^2$/kg to 70 A·$m^2$/kg. The finer a powder becomes, the smaller the σS tends to become.

In the present invention, a magnetic recording medium is effective because the medium comprising a coating type barium ferrite (BaFe) magnetic layer, where dispersion liquid containing a barium ferrite powder of hexagonal ferrite is coated on a base and a magnetic layer is formed, specifically comprising the coating type barium ferrite magnetic layer using a barium ferrite material whose plate diameter is not more than 40 nm is excellent in a reproducing output in high density recording (specifically linear recording density more than 100 kfci) and has a characteristic of being low in noise.

<PR(1, a, b, c, d, e) ML Signal Processing>

The PR(1, a, b, c, d, e) ML signal processing reproduces a signal sequence showing a maximum likelihood using intercode interference occurring at a high density recording. The signal sequence is represented in PR(1, a, b, c, d, e).

On the basis of the above-mentioned PRML (Partial Response Maximum Likelihood) signal processing, will be described the reproducing method, a reproducing apparatus, a recording and reproducing apparatus, and a recording medium according to the present invention.

The recording and reproducing apparatus 10 according to an embodiment of the present invention includes, as shown in FIG. 1, a recording section 10A and a reproducing section 10B, and thus, the reproducing apparatus can be obtained by omitting the recording section 10A in the recording and reproducing apparatus 10. Similarly, the recoding section 10A can be obtained by omitting the reproducing section 10B in the recording and reproducing apparatus 10. A magnetic recording medium 20 may be driven by a drive unit 21. More specially, if the recording medium 20 is a tape, for example, the drive unit 21 drives reels (not shown) and a capstan roller (not shown) that travels the tape at desired speeds. For example, if the magnetic recording medium 20 is a disk, the drive unit 21 rotates the disk and controls a position of a head (not shown) above the disk. The magnetic recording medium 20 is either removal (for example, a floppy disk drive and a hard disk drive) from or fixed (for example a hard disk drive) to the drive unit 21.

The recording and reproducing apparatus 10 records data as the information signal in a magnetic recording medium 20 and reproduces data recorded in the magnetic recoding medium 20 through the PR(1, a, b, c, d, e)ML signal process. In this example, a magnetic recording medium is prepared in which barium ferrite (BaFe) is formed as the magnetic layer.

The recording and reproducing apparatus 10 comprises a precoder 11, a recording amplifier 12a, a reproducing amplifier 12b, and a recording head 13 as the recording section 10A and further comprises a reproducing head 14, a reproducing amplifier 12b, an equalizer 15, a maximum likelihood decoder (ML decoder) 16, and a decoder (demodulation circuit) 17 as the reproducing section 10B.

The precoder 11 is provided before the data is recorded to prevent data errors occurring during demodulation from propagating.

The recording amplifier 12a amplifies the coded information signal coded by the precoder 11. The recording head 13 magnetizes the barium ferrite formed in the magnetic layer of the magnetic recording medium 20 to record data at a predetermined clock cycle (bit length) with reference to a clock signal supplied to the recording section 10A.

The reproducing head 14 is in contact with the magnetic layer of the magnetic recording medium 20 to read a magnetization change of the magnetic layer to obtain an analog reproducing signal. The analog reproducing signal is obtained by differentiating a signal recorded in the magnetic layer of the magnetic recording medium 20, and is expressed in a transfer characteristic of (1-D). The reproducing amplifier 12b amplifies the signal detected by the reproducing head 14.

Figure 2:
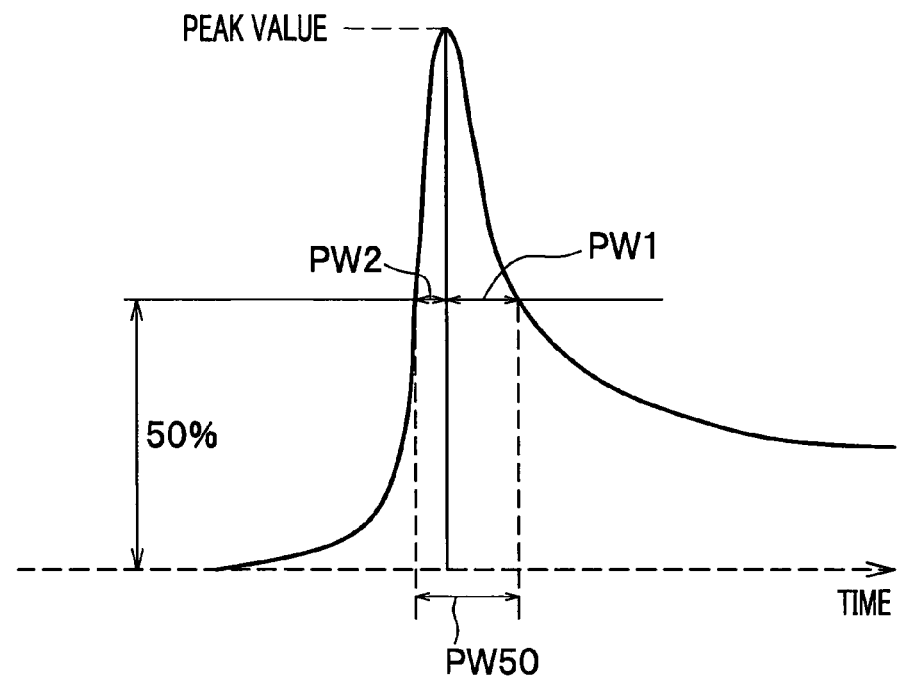
FIG. 2 shows an example of an isolated inversion reproducing waveform occurring in the recording and reproducing apparatus according to the embodiment of the present invention.

An example of a waveform of the analog reproducing signal generated by reading of the reproducing head 14 is shown in FIG. 2. Here, will be described an example in which an isolated inversion reproducing waveform is generated at a timing of a rising edge of a pulse signal recorded in the magnetic recording medium 20.

The isolated inversion reproducing waveform shown in FIG. 2 has a peak in a positive direction, and left/right of the peak results in asymmetry. In addition, in the isolated inversion reproducing waveform, out of a half-width PW50 of a peak value, a right width PW1 results in being larger than a left width PW2. This caused by influence of a vertical magnetization component of barium ferrite.

Meanwhile, in FIG. 2, although the isolated inversion reproducing waveform with the peak in the positive direction is shown as the analog reproducing signal, a waveform of the analog reproducing signal is practically composed of two isolated inversion reproducing waveforms with respective peaks in the positive and negative directions overlapping. This is because the isolated inversion reproducing waveform with the peak in the negative direction is also generated at a timing of a falling edge of a pulse signal recorded in the magnetic recording medium 20.

Figure 3:
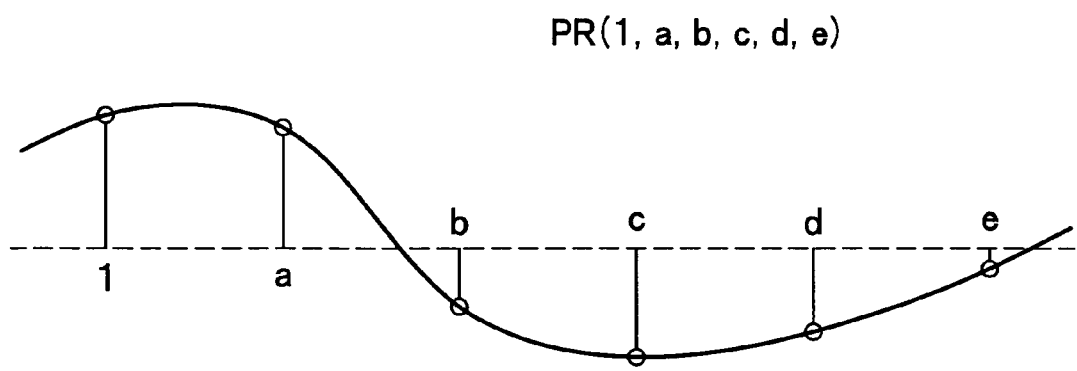
FIG. 3 illustrates a partial response of PR (1, a, b, c, d, e) in the recording and reproducing apparatus shown in FIG. 1.

The equalizer 15 equalizes a signal transferred from the reproducing head 14 through the reproducing amplifier 12b. When a transfer characteristic of PR (1, a, b, c, d, e·) is $1+a \cdot D+b \cdot D^2+c \cdot D^3+d \cdot D^4+e \cdot D^5 =(1-D)(1+f_1 \cdot D+f_2 \cdot D^2+f_3 \cdot D^3+f_4 \cdot D^4)$, the equalizer 15 performs an equalization so that the transfer characteristic is expressed in $1+f_1 \cdot D+f_2 \cdot D^2+f_3 D^3+f_4 \cdot D^4$. Thus, the partial response after equalization is represented by PR(1, a, b, c, d, e) shown in FIG. 3. The coefficients a, b, c, d, and e of the PR(1, a, b, c, d, e) have respective predetermined values. However, these coefficients a, b, c, d, and e are obtained in simulation mentioned later, and thus they will be described later.

The maximum likelihood decoder 16 identifies data equalized by the equalizer 15. A maximum likelihood decoding is a method of detecting a maximum likelihood data sequence when performing recording/reproducing with making a correlation exist between data, and is a known technology. Then, the decoder 17 decodes a signal obtained through PR(1, a, b, c, d, e) to reproduce the original data (for example, (0, 1, 0)). This allows the data recorded in the magnetic recording medium 20 to be correctly restored like the original data thereof.

<Simulation>

A reproduced waveform recorded on the magnetic recording medium 20 changes in various manners due to influence from neighbor magnetized areas, so that simulations (1) and (2) were made with various reproduction waveforms to obtain optimum values for the PR(1, a, b, c, d, e) to correctly reproduce the original data with the recording and reproducing apparatus from a reproduced waveform that was distorted due to the influence by the neighbor magnetized areas.

<Simulation (1)>

In the simulation (1), assuming that a shortest bit length (hereinafter referred to as "bit length") recorded in the magnetic recording medium is T, a normalized line density K, namely, K=[(PW50)/(bit length T)] is varied. For each normalized line density K, coefficients a, b, c, d, and e that can provide the lowest bit error rate are obtained, and the bit error rate under that condition is also obtained. Here, the bit error rate indicates a ratio of the number of errors to the number of bits in the original signal.

<Target of Simulation (1)>

When the bit error rate obtained for each normalized line density K is more improved than that for each normalized line density K obtained by the general EEEPRML method that uses PR(1, 3, 2, −2, −3, −1), the coefficients a, b, c, d and e satisfying the condition are determined as preferred optimum coefficients.

Further, if the bit error rate when PR (1, a, b, c, d, e) is adopted is not greater than $10^{-4}$ (1E-04), the coefficients a, b, c, d, and e are determined as more preferable optimum coefficients.

<Result of Simulation (1)>

FIG. 4 shows a result of the simulation (1). In the table, the normalized line density K is varied from 2.3 to 5.2, and the coefficients a, b, c, d, e and other results are obtained for each normalized line density K.

For example, when the normalized line density K is 2.3, the values of the coefficients a, b, c, d, and e are "0.4", "−0.6", "−0.2", "−0.4", "0.0", respectively. The resultant bit error rate is less than $10^{-6}$ (1E-06) (see a column of BER at PR(1, a, b, c, d, e). In other words, the bit error rate in this condition is judged to be less than $10^{-4}$ (1E-04), namely, preferable optimum values, which result is shown as a mark of a circle at the upper rightmost section of the table. In the table, "BER" denotes the bit error rate.

Further, the bit error rate when the normalized line density K is 2.3 is judged to be lower than the bit error rate when the PR(1, 3, 2, −2, −3, −1) is used. This result is shown at the upper second rightmost section with a circular mark.

Consider the result of the simulation (1) shown in the table in FIG. 4, the bit error rates for all normalized line densities K are lower than those when the PR(1, 3, 2, −2, −3, −1) is used (see marks of circles at a column indicating comparison results with the normalized PR (1, 3, 2, −3, −3, −1)). Accordingly, the bit error rates in the case of the PR(1, 3, 2, −2, −3, −1) when values of the normalized line density K is "2.3", "2.6", "3.1", "3.4", "3.9", and "4.7", respectively, are lower than $10^{-4}$ (see circular marks at the rightmost column in the table).

From the analysis mentioned above, ranges between values of coefficients a, b, c, d, and e (inclusive) with circular marks in the error rate judgment and the values of coefficients a, b, c, d, and e (not-inclusive) in the normalized PR (1, 3, 2, −3, −3, −1), respectively provide optimum PRML operation. Thus, there is determined a condition satisfying the optimum PRML method that $0.4 \leq a < 3.0$, $-0.6 \leq b < 2.0$, $-2.0 < c \leq -0.2$, $-3.0 < d \leq -0.4$, $-1.0 < e \leq 0.0$. Further, the normalized line density K is determined as $K \leq 5.0$ for the optimum PRML. This condition makes the bit error rate less than $10^{-4}$, which provides a more preferable PRML method for the magnetic recording medium 20.

Further, ranges of minimum and maximum values of the coefficients a, b, c, d, and e shown in the table in FIG. 4 provide further optimum PRML operations. In other wards, the ranges are $0.4 \leq a \leq 1.3$, $-0.6 \leq b \leq 0.0$, $-1.1 \leq c \leq -0.2$, $-1.0 \leq d \leq -0.4$, and $-0.3 \leq e \leq 0.0$.

<Simulation (2)>

In simulation (2), the bit error rates are obtained in which varied is a ratio γ (%) indicating asymmetry of the isolated inversion reproducing waveform shown in FIG. 2 under a condition that PR(1, 0.9, −0.4, −0.8, −0.6, −0.1) and K=3.1, where γ=[[(PW1)−(PW2)]/(PW50)×100]. Next, a difference is obtained in order between one of a plurality of bit error rates showing the lowest value and each of the bit error rates (hereinafter referred as "BER relative value", wherein "BER" is abbreviation of "bit error rate").

<Target of Simulation (2)>

When the BER relative value obtained for each ratio γ is within 1.0 (order), it is determined that a target of the simulation (2) is reached, and the ratio γ satisfying the condition is determined as an optimum value.

<Result of Simulation (2)>

FIG. 5 shows the result of the simulation (2).

As shown in the table in FIG. 5, the ratio γ varies from 4.8% to 60.0%, and the BER relative value is obtained for each ratio γ. The value of the ratio γ becomes the lowest one when the BER relative value is zero, namely, the lowest value is 30.4. Further, the range of the γ showing the BER relative values that are within 1.0 order is from 9.8% to 60.0%, wherein the range is indicated with circle marks.

As mentioned above, when the ratio γ satisfies a relation of $9.8 \leq \gamma \leq 60$, a suitable error rate characteristic is provided.

| <Prescription of Coating Liquid for BaFe Magnetic Layer> | |
|---|---|
| Barium ferrite magnetic powder | 100 parts |
| Polyurethane resin | 14 parts |
| Mass average molecular weight: 10000 | |
| Sulphonic acid functional group: 0.05 meq/g | |
| Abrasive | 8 parts |
| Carbon black (particle size: 0.015 μm) | 0.5 parts |
| #55 (manufactured by Asahi Carbon Co., Ltd) | |
| Stearic acid | 0.5 parts |
| Butyl stearate | 2 parts |
| Methyethlketone | 180 parts |
| Cyclohexanone | 100 parts |
| <Prescription of Coating Liquid for Non-Magnetic Layer> | |
| Non-Magnetic powder: α iron oxide | 100 parts |
| Average primary particle size: 0.09 μm | |
| Specific surface area by BET method: 50 m²/g | |
| pH: 7 | |
| DBP oil absorption amount: 27 to 38 ml/100 g | |
| Surface treatment layer: $Al_2O_3$ | |
| exists by 8 mass % for total particles. | |
| Carbon black | 25 parts |
| CONDUCTEX SC-U | |
| (manufactured by Colombian Carbon Corp.) | |
| Vinyl chloride copolymer: MR104 | 13 parts |
| (manufactured by ZEON CORP.) | |
| Polyurethane resin: UR8200 | 5 parts |
| (manufactured by TOYOBO CO., LTD) | |
| Phenyl phosphoric acid | 3.5 parts |
| Butyl stearate | 1 part |
| Stearic acid | 2 parts |
| Methyethlketone | 205 parts |
| Cyclohexanone | 135 parts |

<Manufacturing of Tape>

According to the prescriptions of the above coating liquid, each constituent was kneaded by a kneader. The kneaded liquid obtained was passed by a pump to a horizontal sand mill where beads of 1.0 mm diameter were filled with zirconia of an amount of 80% for a volume of a dispersion unit, was dispersed for 120 minutes (time of substantially staying in the dispersion unit) at 2000 rpm, and thus dispersion liquid for a magnetic layer and one for an non-magnetic layer were adjusted, respectively. Furthermore, to the dispersion liquid for the magnetic layer was added methylethylketone by three parts, the dispersion liquid was filtrated with a filter having an average particle diameter of 1 μm, and thus the coating liquid for forming the magnetic layer was obtained. In addition, to the dispersion liquid for the non-magnetic layer was added polyisocyanate by 2.5 part and moreover methylethylketone by three part, the dispersion liquid was filtrated with using a filter with an average particle diameter of 1 μm, and thus the coating liquid for forming the non-magnetic layer was obtained.

The obtained coating liquid for forming the non-magnetic layer was coated and dried on a polyethylene naphthalete of a thickness of 4 μm so that a thickness of the liquid after drying became 1.5 μm, and thus the non-magnetic layer was formed. After then, the coating liquid for forming the magnetic layer was sequentially coated over on the non-magnetic layer so that a thickness of the magnetic layer became 30 nm to 210 nm; while the magnetic layer was still in a wet state, a BaFe magnetic material within the magnetic layer by a cobalt magnet and solenoid with each magnetic force of 600 mT was in-plane oriented; furthermore a magnetic field was applied in a vertical direction by the cobalt magnet with a magnetic force of 600 mT; thus the magnetic material was obliquely oriented; and the magnetic field in the vertical direction was kept 5 n till drying of the magnetic layer was finished. Next, a treatment was performed by a 7-high calendar roll at a temperature of 90 degrees Celsius and a linear pressure of 300 kg/cm (294 kN/m). After then, coating liquid of a prescription below for forming a back layer was coated on an opposite face where the non-magnetic layer and the magnetic layer were formed, the back layer of a thickness of 0.5 μm was formed, and thus a web raw material was obtained.

The invention claimed is:

1. A method of reproducing an information signal recorded in a magnetic recording medium including a magnetic layer including hexagonal ferrite, the method comprising the steps of:
reproducing the information signal from the magnetic recording medium; and
effecting PR (1, a, b, c, d, e) ML signal processing under a condition that $0.4 \leq a < 3.0$, $-0.6 \leq b < 2.0$, $-2.0 < c \leq -0.2$, $-3.0 < d \leq -0.4$, and $-1.0 < e \leq 0.0$,
wherein, when an isolated inversion waveform is reproduced as the information signal, the isolated inversion reproduced waveform has asymmetry at a ratio γ (%), and $9.8 \leq \gamma \leq 60$.

2. The method as claimed in claim 1, wherein $0.4 \leq a \leq 1.3$, $-0.6 \leq b \leq 0.0$, $-1.1 \leq c \leq -0.2$, $-1.0 \leq d \leq -0.4$, and $-0.3 \leq e \leq 0.0$.

3. The method as claimed in claim 2, wherein the reproduced information signal shows a normalized line density K, and $K \leq 5.0$.

4. The method as claimed in claim 3, wherein the hexagonal ferrite comprises barium ferrite.

5. The method as claimed in claim 2, wherein the hexagonal ferrite comprises barium ferrite.

6. The method as claimed in claim 1, wherein the reproduced information signal shows a normalized line density K, and $K \leq 5.0$.

7. The method as claimed in claim 6, wherein the hexagonal ferrite comprises barium ferrite.

8. The method as claimed in claim 6, wherein $2.0 < K < 5.0$.

9. The method as claimed in claim 1, wherein the hexagonal ferrite comprises barium ferrite.

10. The method as claimed in claim 1, wherein, when an isolated inversion waveform is reproduced as the information signal, the isolated inversion reproduced waveform has asymmetry.

11. A reproducing apparatus for reproducing an information signal recorded in a magnetic recording medium including a magnetic layer including hexagonal ferrite, the apparatus comprising:
a reproducing head for reading the information signal from the magnetic recording medium;
an equalizer for equalizing the information signal read from the magnetic recording medium, wherein a partial response of the information signal after equalization by the equalizer satisfies a condition that $0.4 \leq a < 3.0$, $-0.6 \leq b < 2.0$, $-2.0 < c \leq -0.2$, $-3.0 < d \leq -0.4$, and $-1.0 < e \leq 0.0$,
wherein, when an isolated inversion waveform is reproduced as the information signal, the isolated inversion reproduced waveform has asymmetry at a ratio γ (%), and $9.8 \leq \gamma \leq 60$.

12. The reproducing apparatus as claimed in claim 11, wherein $0.4 \leq a \leq 1.3$, $-0.6 \leq b \leq 0.0$, $-1.1 \leq c \leq -0.2$, $-1.0 \leq d \leq -0.4$, and $-0.3 \leq e \leq 0.0$.

13. The reproducing apparatus as claimed in claim 12, wherein the hexagonal ferrite comprises barium ferrite.

14. The reproducing apparatus as claimed in claim 11, wherein the hexagonal ferrite comprises barium ferrite.

15. A recording and reproducing apparatus comprises:
recording means for recording an information signal in a magnetic recording medium including a magnetic layer including hexagonal ferrite; and
reproducing means for reproducing the information signal recorded in the magnetic recording medium, the reproducing means comprising:
a reproducing head for reading the information signal from the magnetic recording medium; and
an equalizer for equalizing the information signal read from the magnetic recording medium, wherein a partial response of the information signal after equalization by the equalizer satisfies a condition that $0.4 \leq a < 3.0$, $-0.6 \leq b < 2.0$, $-2.0 < c \leq -0.2$, $-3.0 < d \leq -0.4$, and $-1.0 < e \leq 0.0$,
wherein, when an isolated inversion waveform is reproduced as the information signal, the isolated inversion reproduced waveform has asymmetry at a ratio γ (%), and $9.8 \leq \gamma \leq 60$.

16. The magnetic recording medium used in the recording and reproducing apparatus as claimed in claim 15.

17. A method of reproducing an information signal recorded in a magnetic recording medium including a magnetic layer including hexagonal ferrite in-plane oriented or randomly oriented, vertically magnetized, the method comprising the steps of:
reproducing the information signal from the magnetic recording medium; and
effecting PR (1, a, b, c, d, e) ML signal processing under a condition that $0.4 \leq a < 3.0$, $-0.6 \leq b < 2.0$, $-2.0 < c \leq -3.0 < d \leq -0.4$, and $-1.0 < e \leq 0.0$,
wherein, when an isolated inversion waveform is reproduced as the information signal, the isolated inversion reproduced waveform has asymmetry at a ratio γ (%), and $9.8 \leq \gamma \leq 60$.

18. A method of reproducing an information signal recorded in a magnetic recording medium including a magnetic layer including hexagonal ferrite, the method comprising the steps of:
reproducing the information signal from the magnetic recording medium; and
effecting PR (1, a, b, c, d, e) ML signal processing under a condition that $0.4 \leq a < 3.0$, $-0.6 \leq b < 2.0$, $-2.0 < c \leq -0.2$, $-3.0 < d \leq -0.4$, and $-1.0 < e \leq 0.0$,
wherein the reproduced information signal shows a normalized line density K, and $3.0 < K \leq 5.0$.

* * * * *